US011228625B1

(12) United States Patent
Libin

(10) Patent No.: US 11,228,625 B1
(45) Date of Patent: Jan. 18, 2022

(54) AI DIRECTOR FOR AUTOMATIC SEGMENTATION, PARTICIPANT BEHAVIOR ANALYSIS AND MODERATION OF VIDEO CONFERENCES

(71) Applicant: All Turtles Corporation, San Francisco, CA (US)

(72) Inventor: Phil Libin, San Francisco, CA (US)

(73) Assignee: mmhmm inc., San Francisco, CA (US)

( * ) Notice: Subject to any disclaimer, the term of this patent is extended or adjusted under 35 U.S.C. 154(b) by 63 days.

(21) Appl. No.: 16/259,514

(22) Filed: Jan. 28, 2019

Related U.S. Application Data

(60) Provisional application No. 62/625,388, filed on Feb. 2, 2018.

(51) Int. Cl.
*H04L 29/06* (2006.01)
*G06K 9/00* (2006.01)

(52) U.S. Cl.
CPC ...... *H04L 65/1083* (2013.01); *G06K 9/00315* (2013.01); *G06K 9/00355* (2013.01); *G06K 9/00604* (2013.01); *H04L 65/1069* (2013.01)

(58) Field of Classification Search
CPC ............ H04L 65/1083; H04L 65/1069; G06K 9/00355; G06K 9/00604; G06K 9/00315
USPC ....................................................... 709/231
See application file for complete search history.

(56) References Cited

U.S. PATENT DOCUMENTS

| 9,843,768 | B1 * | 12/2017 | Negi ...................... H04H 60/33 |
| 2016/0173821 | A1 * | 6/2016 | De Magalhaes ......... H04N 7/15 |
| | | | 348/14.08 |
| 2016/0191958 | A1 * | 6/2016 | Nauseef ............. H04N 21/8153 |
| | | | 725/116 |

OTHER PUBLICATIONS

Madansky et al., "Weighted Standard Error and its Impact on Significance Testing" (2017), Retrieved from the URL: http://www.analyticalgroup.com/download/WEIGHTED_MEAN.pdf.*

* cited by examiner

*Primary Examiner* — David R Lazaro
*Assistant Examiner* — Zia Khurshid
(74) *Attorney, Agent, or Firm* — Muirhead and Saturnelli, LLC

(57) ABSTRACT

Managing a video conference includes connecting participants of the videoconference to at least one video conferencing server that sends and receives video streams between the participants, detecting non-verbal cues of the participants, using the non-verbal cues to track reactions of the participants to segments of a presentation provided by a speaker and to interactions among participants, determining a health index of the video conference based on the reactions of the participants, and providing to at least a subset of the participants recommendations based on the health index for modifying the video conference. The non-verbal cues may include facial expressions, body language, gestures, postures, and/or eye contact. The interactions among participants may include discussions, agreement, disagreement, interruption, and/or eye-rolling. The recommendations may include asking a participant to provide an opinion on a subject matter being discussed in the video conference. The participant may be an expert.

32 Claims, 7 Drawing Sheets

AI DIRECTOR FOR AUTOMATIC SEGMENTATION, PARTICIPANT BEHAVIOR ANALYSIS AND MODERATION OF VIDEO CONFERENCES

CROSS-REFERENCE TO RELATED APPLICATIONS

This application claims priority to U.S. Prov. App. No. 62/625,388, filed on Feb. 2, 2018, and entitled "AI DIRECTOR FOR AUTOMATIC SEGMENTATION, PARTICIPANT BEHAVIOR ANALYSIS AND MODERATION OF VIDEO CONFERENCES", which is incorporated herein by reference.

TECHNICAL FIELD

This application is directed to the field of information technologies for video conferencing, and more particularly to automatic segmentation, behavior analysis of participants and semi-automatic moderation of video conferences.

BACKGROUND OF THE INVENTION

Growing globalization and mobilization of workforce requires distributed project execution, necessitates continuous coordination between participating teams and individual contributors and makes efficient communications between project participants a major productivity factor. A significant number of general purpose and specialized collaboration systems and tools have been developed to support various aspects of shared project work. An important aspect of productive communications between remote teams is video conferencing.

According to reports by Transparency Market Research, the global video conferencing market is expected to grow to $8.95 billion by 2025, expanding at a CAGR of 8.3% during the forecast period between 2017 and 2025. Skype has recently disclosed that since the 2011 acquisition by Microsoft, users have spent, on average, eight billion hours of social video calls each year. Multiple surveys conducted on behalf of Cisco have discovered strong interest of respondents, especially younger workers, in meetings conducted via video conferencing. In particular, according to the Redshift Research survey, 84 percent of all respondents would rely on virtual meetings with video for at least one out of every four workplace interactions, while 87 percent of young respondents would prefer to work for a more video-enabled organization over the one that limits its investment in video conferencing. Besides an expectation to see video as an almost default upcoming communications tool, 75 percent of young respondents stated that they would not settle for a low quality video. Articulating some of the desired user experiences, 54 percent of respondents of the Redshift Research survey showed interest in customizing viewer's experiences by integrating videoconferencing with social media sharing tools, while 21 percent would expect real-time language translation and pop-up bubbles that provide LinkedIn and Salesforce information on meeting participants when available. In a separate study, video conferencing has emerged as a preferred communication tool for job seekers: according to a PGI survey, 66 percent of job candidates prefer video interviews over traveling to meet a potential employer.

An important new aspect of video conferencing, absent from other communications methods, is an ability of its participants to communicate using non-verbal cues, including facial expressions, body language, gestures, postures and, to a limited extent, eye contact. It is estimated that only a small portion of human brain processes verbal information, while nearly 93 percent of standard communications are made of non-verbal information, manifesting attitude, emotional state and behavior of meeting participants.

Leading video conferencing products and services, such as ClickMeeting, Zoom, Skype for Business, BlueJeans, WebEx, join.me, GoToMeeting, RingCentral and many more, are offering a broad range of meeting setups, layouts, role management options, content sharing, whiteboarding, viewing, audio, recording, social sharing and other features that are moving video conferencing into the mainstream business reality.

Notwithstanding significant progress in video conferencing products and services, their key advantages have not been fully realized to date. Roles of meeting participants are still limited to traditional responsibilities, such as organizer, presenter, listener, commenter; current video conferencing products and services don't account for attitudes and behaviors of participants that may be dynamically changing during a meeting and may reflect the progress of discussions. Analogously, methods of real-time measurements of meeting efficiency and automatic monitoring and moderation of meetings do not exist.

Accordingly, it is desirable to provide a mechanism for automatic analysis of participant behavior in video conferences, dynamic assessment of meeting efficiency, and automatic monitoring and moderating of video conferences.

SUMMARY OF THE INVENTION

According to the system described herein, managing a video conference includes connecting participants of the videoconference to at least one video conferencing server that sends and receives video streams between the participants, detecting non-verbal cues of the participants, using the non-verbal cues to track reactions of the participants to segments of a presentation provided by a speaker and to interactions among participants, determining a health index of the video conference based on the reactions of the participants, and providing to at least a subset of the participants recommendations based on the health index for modifying the video conference. The non-verbal cues may include facial expressions, body language, gestures, postures, and/or eye contact. The interactions among participants may include discussions, agreement, disagreement, interruption, and/or eye-rolling. The recommendations may include asking a participant to provide an opinion on a subject matter being discussed in the video conference. The participant may be an expert in the subject matter being discussed. The participant may be asked to provide an opinion in response to the participant not participating in the discussion and/or the participant looking bored or indifferent. The participant may be asked to provide an opinion in response to the health index being below a pre-determined value. The health index may be a weighted sum of participant numbers for each possible role of each of the participants. Positive weights may be assigned to active and productive roles and negative weights may be assigned to passive, indifferent and unproductive roles and the roles may be based, at least in part, on the reactions of the participants. The health index is provided by:

$$h = \left( \sum_{i \in P^+} w_i^+ \cdot n_i + \sum_{i \in P^-} w_i^- \cdot n_i \right) \Big/ (W \cdot N)$$

where h is a video conference health index, $P^+$, $P^-$ are sets of positive (active, productive) and negative (passive, non-productive) roles currently identified by the system among conference participants, $w_i^+, w_i^-$ are positive and negative numeric values of weights assigned to each role, $n_i$ is a number of conference participants identified by the system in each role, $W = \Sigma_{i \in P^+} |w_i^+| + \Sigma_{i \in P^-} |w_i^-|$; and $N = |P^+| + |P^-|$. Managing a video conference may also include providing a visual health board that includes a graphical representation of the health index. The visual heath board may include a conference status graph that dynamically shows a count of participants in each of a plurality of possible roles that are determined based, at least in part, on the reactions of the participants. At least some of the recommendations may be placed on the visual health board. The video streams may be pre-processed to create normalized frontal views of the participants. For a group of participants that share one or more video cameras, individual participants may be identified and tracked within a sequence of scenes captured by the one or more video cameras to create the normalized frontal views. A plurality of the normalized frontal views of participants may be arranged together on a single display. The normalized frontal views may be speaker centric with a magnified view of the speaker. The normalized frontal views may be placed in columns according to categories that correspond to a feature related to the video conference. Managing a video conference may also include using data from embedded sensors of wearable devices owned by meeting participants along with the non-verbal cues to track reactions of the participants to segments of a presentation provided by the speaker. The data from embedded sensors may also include data for heart rate, sweating, and/or blood pressure. At least some of the recommendations may be broadcast to at least some of the participants. At least some of the recommendations may be generated based on the health index falling below a pre-determined threshold. At least some of the recommendations may be generated based on analyzing profiles of the participants.

According further to the system described herein, a non-transitory computer readable medium that contains software that manages a video conference. The software includes executable code that connects participants of the videoconference to at least one video conferencing server that sends and receives video streams between the participants, executable code that detects non-verbal cues of the participants, executable code that uses the non-verbal cues to track reactions of the participants to segments of a presentation provided by a speaker and to interactions among participants, executable code that determines a health index of the video conference based on the reactions of the participants, and executable code that provides to at least a subset of the participants recommendations based on the health index for modifying the video conference. The non-verbal cues may include facial expressions, body language, gestures, postures, and/or eye contact. The interactions among participants may include discussions, agreement, disagreement, interruption, and/or eye-rolling. The recommendations may include asking a participant to provide an opinion on a subject matter being discussed in the video conference. The participant may be an expert in the subject matter being discussed. The participant may be asked to provide an opinion in response to the participant not participating in the discussion and/or the participant looking bored or indifferent. The participant may be asked to provide an opinion in response to the health index being below a pre-determined value. The health index may be a weighted sum of participant numbers for each possible role of each of the participants. Positive weights may be assigned to active and productive roles and negative weights may be assigned to passive, indifferent and unproductive roles and the roles may be based, at least in part, on the reactions of the participants. The health index is provided by:

$$h = \left( \sum_{i \in P^+} w_i^+ \cdot n_i + \sum_{i \in P^-} w_i^- \cdot n_i \right) / (W \cdot N)$$

where h is a video conference health index, $P^+$, $P^-$ are sets of positive (active, productive) and negative (passive, non-productive) roles currently identified by the system among conference participants, $w_i^+, w_i^-$ are positive and negative numeric values of weights assigned to each role, $n_i$ is a number of conference participants identified by the system in each role, $W = \Sigma_{i \in P^+} |w_i^+| + \Sigma_{i \in P^-} |w_i^-|$; and $N = |P^+| + |P^-|$. The software may also include executable code that provides a visual health board that includes a graphical representation of the health index. The visual heath board may include a conference status graph that dynamically shows a count of participants in each of a plurality of possible roles that are determined based, at least in part, on the reactions of the participants. At least some of the recommendations may be placed on the visual health board. The video streams may be pre-processed to create normalized frontal views of the participants. For a group of participants that share one or more video cameras, individual participants may be identified and tracked within a sequence of scenes captured by the one or more video cameras to create the normalized frontal views. A plurality of the normalized frontal views of participants may be arranged together on a single display. The normalized frontal views may be speaker centric with a magnified view of the speaker. The normalized frontal views may be placed in columns according to categories that correspond to a feature related to the video conference. The software may also include executable code that uses data from embedded sensors of wearable devices owned by meeting participants along with the non-verbal cues to track reactions of the participants to segments of a presentation provided by the speaker. The data from embedded sensors may also include data for heart rate, sweating, and/or blood pressure. At least some of the recommendations may be broadcast to at least some of the participants. At least some of the recommendations may be generated based on the health index falling below a pre-determined threshold. At least some of the recommendations may be generated based on analyzing profiles of the participants.

The proposed system captures and processes video streams from each individual and group meeting participant, creates normalized participant views for both individual and group participants, recognizes non-verbal cues displayed by meeting participants, such as facial expressions, gestures and postures, identifies speakers and non-verbal reactions of meeting participants to speaking fragments of the speakers and interactions among the participants, dynamically assigns roles to meeting participants based on an expanded set of participant roles, builds and displays a meeting health panel with indicators and graphs of participant roles and overall meeting health index, and offers automatic moderation with recommendations on enhancing meeting efficiency when meeting health index is below normal levels. The interactions among the participants include discussions, agreement, disagreement, interruption, and eye-rolling.

Various aspects of system functioning are explained as follows.

1. Video conference configuration. A contemporary video conference may connect many dozens or even hundreds of individual and group participants as follows:
   a. Individual participants may be typically located at their desks in business or home offices, at internet cafes or ordinary cafes or at other individual conferencing friendly spaces before video cameras of their own or rented/borrowed notebook computers, tablets or other mobile devices.
   b. Group participants may join the meeting from one or several video-enabled conference rooms, dedicated open areas in offices and other group conferencing friendly spaces.
   c. Video streams from all individual or group participant may be transferred to video conferencing server(s) located in the cloud or on premises. The server may process and integrate received video streams and distribute the integrated stream to viewing devices, such as individual notebooks, tablets and other personal devices or to display monitors of video conferencing systems in participating conference rooms.
   d. In addition to video streams, the system may register and receive data from other sources, such as smart watches, bracelets and other wearable devices owned by meeting participants.
   e. Additionally, the system may keep individual and team profiles of meeting participants, including their emotional types.
2. Capturing and pre-processing of video streams. For individual meeting participants sitting right before video cameras of their notebooks or other devices, capturing and pre-processing video streams may be straightforward as there is only one participant within the stream. The situation may be different for meeting rooms where one or several video conferencing cameras may be installed. In such case, the system may identify individual participants within a sequence of scenes captured by a video camera and track the participants during the meeting, including periods of absence and re-appearance of the participants when they are leaving and re-entering a meeting room and re-positioning of the participants when they are moving within the room.
3. Creating normalized participant views. Advanced video conferencing products, such as Zoom, offer gallery views, whereby frontal facial videos of participants are arranged into a scrollable strip or panel. However, such views are available only for individual participants where the views are directly captured by the participant cameras; such views aren't altered by the system. The proposed system may retrieve frontal magnified views for all participants, including group participants sitting along conference group tables or otherwise joining a video conference from conference rooms. It may be done by processing each video stream from a tracked group participant, as explained above in #2, and, when successful, a normalized frontal view of a participant may be created and added to the gallery. Sometimes, with extreme camera angles, creation of normalized views may fail for certain participants.
4. Recognizing non-verbal cues. The system may constantly recognize facial expression of each participant using an embedded facial recognition module and, where possible, may recognize other non-verbal cues, such as gestures, postures, body language and gaze direction to detect eye contact of group participants captured by conference room cameras. The system may also use data from other sources to detect emotional states of meeting participants, for example, embedded sensors of wearable devices owned by meeting participants; such sensors may measure various physiological characteristics (heart rate, sweating, blood pressure, etc.).
5. Identifying speakers and participant roles. Identifying current speaker(s) among individual participants of a video meeting may be straightforward as their video streams include continuous audio fragments; in case of a group participant, conference room equipment (potentially combined with personal devices held by participants or located in close proximity to participants) may detect speaker(s) by various methods including audio diarization based on voice profiles and disposition, as well as identification of lip movements by the conference room video camera(s). Once the current speaker is detected, the system may track various scenarios of meeting dynamics, including changing reaction of various meeting participants to each speaking fragment, subsequent short speaking fragments and their sequences belonging to other participants (questions and answers, dialogs or comments), etc. Analyzing such scenarios, the system may assign various (non-conventional) roles to meeting participants based on their detected emotional states, attitude and participation specifics. Examples of such enhanced roles may include main speaker, opponent, active listener, supporter, bored participant, inactive (sleeping) participant, etc. Emotional roles of meeting participants may be dynamic and may reflect their varying reactions to discussions, which may also allow the system to cluster participants into like-minded cliques. For example, some participants may express positive emotions (joy, satisfaction, etc.) in response to praise of a certain team by a current speaker or may become bored reacting to a long monotonous talk or to frequent interruptions of the current speaker by one and the same participant.
6. Arranging and displaying normalized participant views. Participant views may be arranged and displayed in various ways on dedicated or common monitors, depending on a meeting status, individual viewing settings or dynamic choices of various participants or other factors. For example, in a speaker centric view, normalized view of a current speaker may be enlarged or otherwise highlighted compared with other participants; in a discussion centric view, normalized views of commenters and/or participants asking questions may also be enlarged or highlighted and displayed in a separate portion of a display, on par with a current speaker; normalized participant views may be grouped by attitudes or voting outcomes, etc.
7. Creating video conference health panel and providing automatic moderation. The system may build a dynamic conference status graph (meeting status graph) by participant roles, such as a histogram of the number of participants in each enhanced role, as explained elsewhere herein. Subsequently, the system may calculate an overall video conference health index based on the meeting status graph. For example, such conference health index may be defined as a weighted sum of participant numbers for each role, where positive weights may be assigned to active and productive roles, while negative weights may signify passive, indifferent and unproductive roles:

$$h = \left( \sum_{i \in P^+} w_i^+ \cdot n_i + \sum_{i \in P^-} w_i^- \cdot n_i \right) \Big/ (W \cdot N)$$

where h is a video conference health index;
$P^+$, $P^-$ are sets of positive (active, productive) and negative (passive, non-productive) roles currently identified by the system among conference participants;
$w_i^+, w_i^-$ are positive and negative numeric values of weights assigned to each role;
$n_i$ is a number of conference participants identified by the system in each role; $W = \Sigma_{i \in P^+} |w_i^+| + \Sigma_{i \in P^-} |w_i^-|$;
$N = |P^+| + |P^-|$.

When determining enhanced roles of meeting participants, the system may consult participant profiles, captured prior to the meeting as explained above. The system may use information about general emotional types of participants (which may be further updated based on their behavior during video conferences) and competence levels of the participants in knowledge domains related to the meeting.

If the meeting health index falls below a predefined level (say, 50% on a normalized scale 0-100%), the system may automatically or semi-automatically moderate the video conference by developing recommendations and displaying, broadcasting, delivering the recommendations to the meeting leader, etc. For example, if a participant known as an expert in the subject matter of the meeting does not participate in the discussion and/or looks indifferent or bored in response to a sequence of speaker and discussion fragments, the system may ask whether the participant is interested to state an opinion about the current discussion (which may, in its turn, change the course of the meeting).

All components of meeting analytics and automatic moderation: meeting status graph, health index, recommendations, and recommendation delivery options—may be combined and displayed in a video conference health panel (dashboard), which may be available to all meeting participants, to dedicated groups of participants or to select individuals (for example, to the meeting leader, organizer and speakers or to the meeting leader only). The meeting health panel provides meeting participants with a dynamic assessment of meeting efficiency and with recommended ways to improve the meeting.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism and system for capturing and processing video streams captured during video conferences with multiple participants, automatically determining dynamic roles of participants, assessing conference efficiency and health indicators, and automatically developing and distributing recommendations for increasing meeting efficiency.

Figure 1:
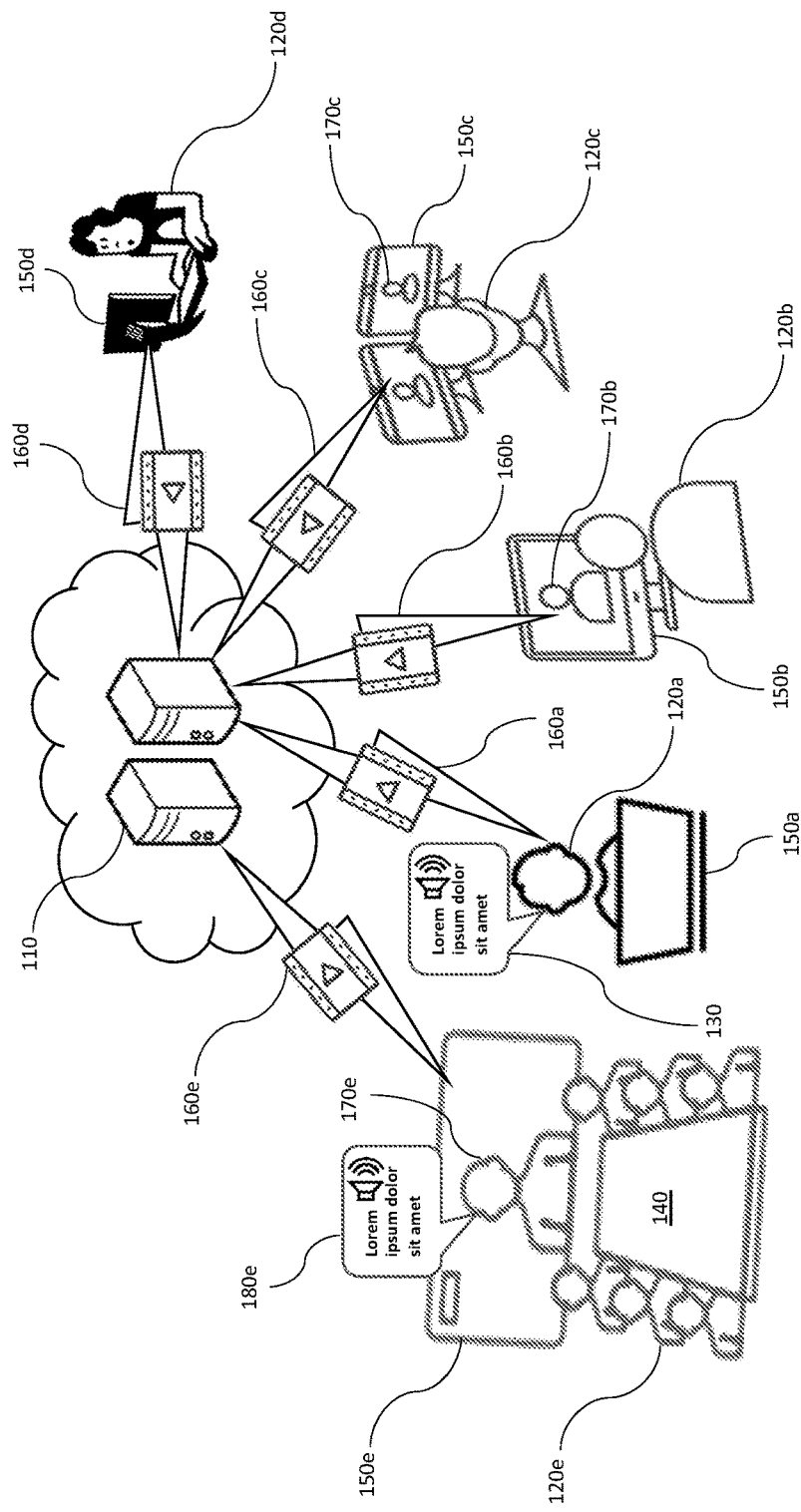
FIG. 1 is a schematic illustration of a configuration of a video conference, according to an embodiment of the system described herein.

FIG. 1 is a schematic illustration 100 of a configuration of a video conference. A video conferencing service 110 running, for example, in the cloud, conducts, processes and monitors a video conference between individual participants 120a, 120b, 120c, 120d, and a group participant 120e where multiple participants are located in a conference room 140. FIG. 1 shows the participant 120a being an active speaker and providing a presentation 130. Individual participants 120a-120d are using personal devices (or possibly kiosks or other rented/borrowed equipment) 150a-150d, while the group participant 120e is utilizing a large conference room screen 150e combined with a personal computer, workstation or with other conference room video-audio conference equipment.

Video streams 160a-160e capture an upstream video from each individual or group video conferencing device of each participant, integrate and process the streams in the video conferencing service 110 and transfer downstream video to video conferencing devices of the participants. An upstream video 160e for a group participant 120e is explained in more detail elsewhere herein. At a then-current stage of a video conference illustrated in FIG. 1, replicas 170b, 170c, 170e of the participant 120a that is the active speaker are displayed on the devices 150b, 150c, 150e. The devices 150a, 150d are turned so that the corresponding replicas of the active speaker aren't visible in FIG. 1. A replica of the presentation 130 of the active speaker is also shown as an audio stream 180e delivered to the conference room 140 (not shown for the participants 120b, 120c).

Figure 2:
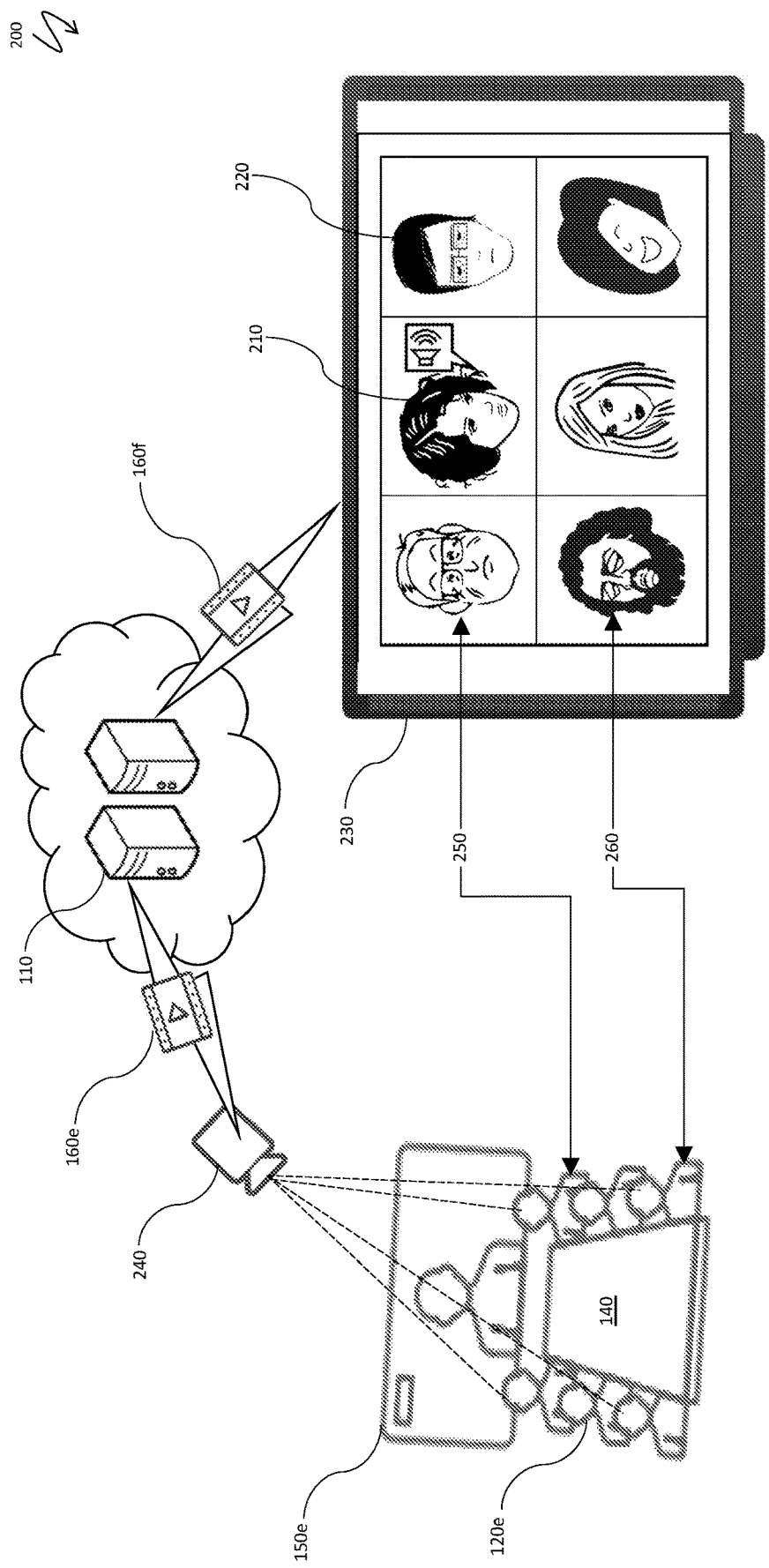
FIG. 2 is a schematic illustration of obtaining normalized participant views, according to an embodiment of the system described herein.

FIG. 2 is a schematic illustration 200 of obtaining normalized participant views. Obtaining normalized views is straightforward and may only require some resizing and minimal image processing for individual participants of a video conference sitting at individual devices and watching the video conference or speaking during the conference. Two examples of such normalized participant views for a current speaker 210 (different from the participant 120a in FIG. 1) and another individual participant 220 are displayed on a dedicated monitor 230, which may be installed in a main conference room or replicated across multiple conference rooms. Alternatively (or additionally), a combined normalized view of meeting participants may be available as a display feature of the video conferencing system for all individual and group participants.

Producing normalized views of participants may be different for a group participant 120e when multiple people are located in a conference room 140 and are watching the conference on a shared screen 150e. To capture participant views, the system may use special camera(s) 240 mounted, for example, on the ceiling of the conference room 140. An upstream portion of the video stream 160e captured by the camera(s) 240 may be processed by the video service 110 to segment and normalize participant views (and to monitor presence and movement across the conference room of each participant located in the room, as explained elsewhere herein). Examples of normalized participant views 250, 260 for a group participant 120e are also shown on the dedicated monitor 230.

Figure 3:
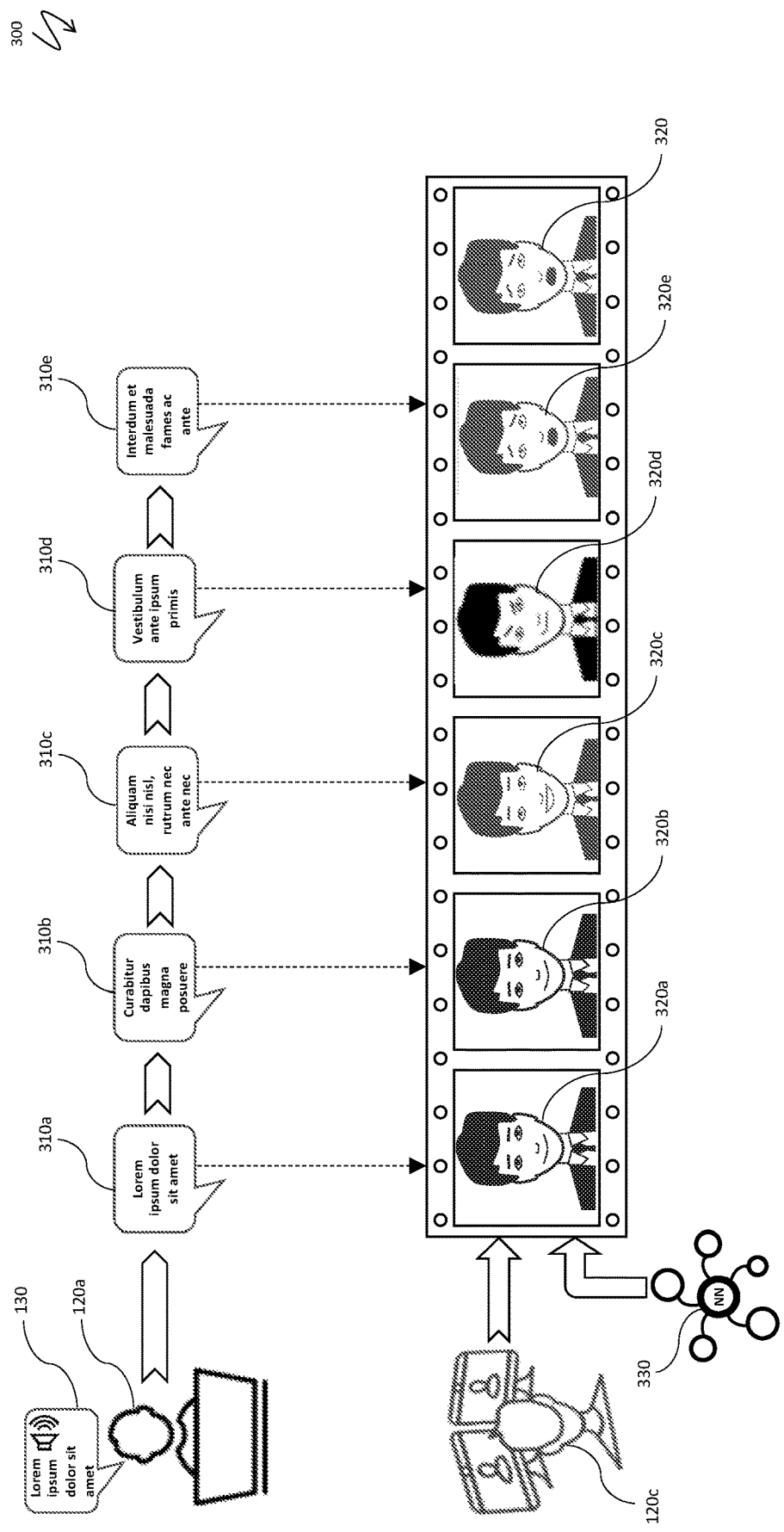
FIG. 3 is a schematic illustration of tracking participant behaviors and facial expressions, according to an embodiment of the system described herein.

FIG. 3 is a schematic illustration 300 of tracking participant behaviors and facial expressions. When a participant 120a, who is a current speaker (see FIG. 1), provides the presentation 130, the video conferencing system may split the presentation 130 into segments 310a-310e and track behaviors and facial expressions of other participants in response to the presentation 130, segment by segment. Thus, the participant 120c reacts to the presentation segments 310a-310e with facial expressions 320a-320d varying from attention 320a, 320b to smile 320c to anger 320d to disappointment 320e; the disappointment expression 320e may be registered as a most recent reaction 320 for the purpose of assessing meeting efficiency. Facial recognition may be performed by a conventional dedicated system component 330, such as a Neural Network based facial recognition technology.

Figure 4B:
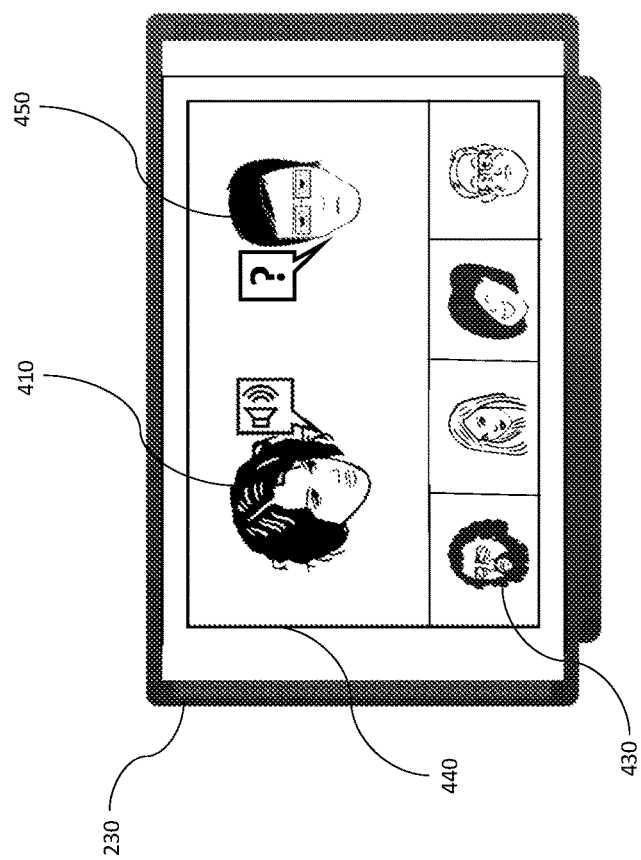
FIGS. 4A-4C are schematic illustrations of arranging and displaying normalized participant views, according to an embodiment of the system described herein.
Figure 4A:
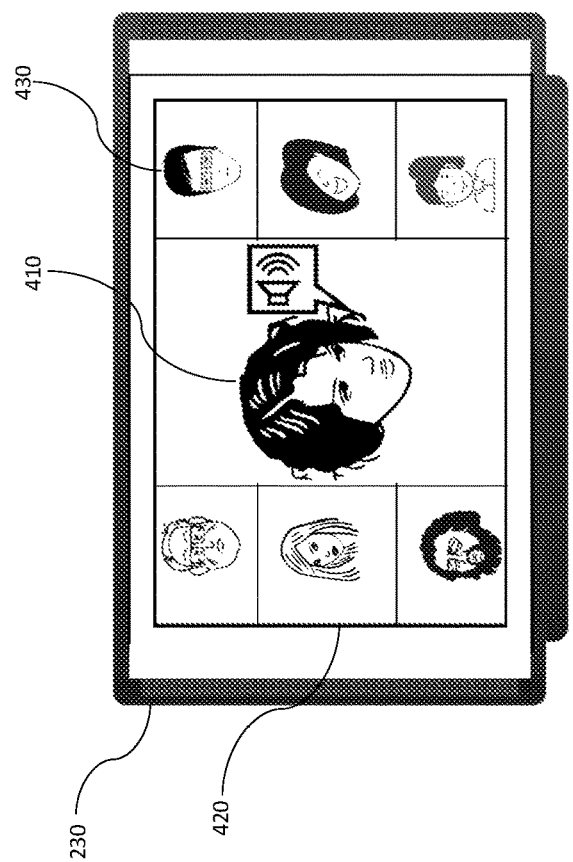
Figure 4C:
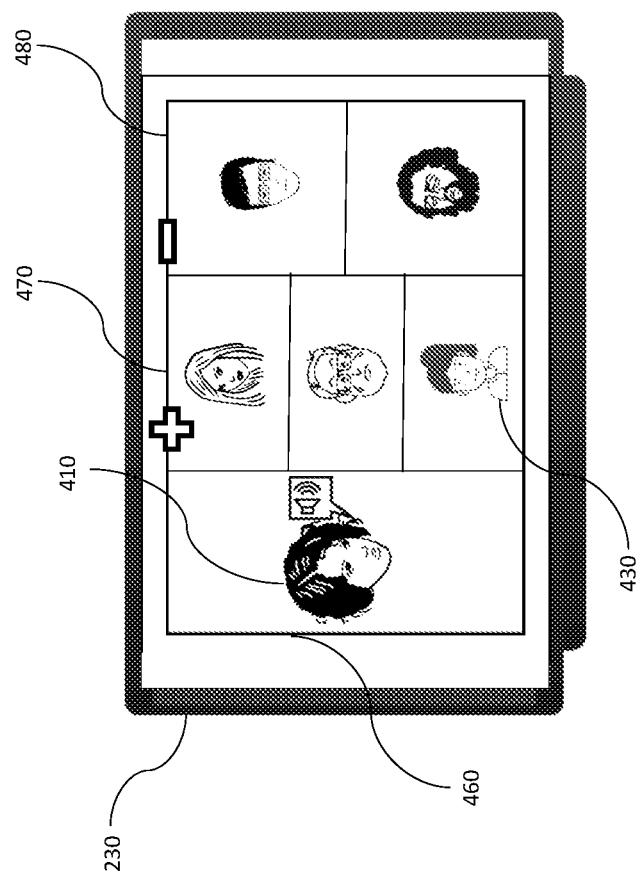

FIGS. 4A-4C are schematic illustrations of arranging and displaying normalized participant views.

FIG. 4A shows a speaker centric arrangement and display of normalized participant views. Once video streams from individual and/or group participants have been processed, normalized participant views have been built and a current speaker have been identified, a dedicated or regular monitor (notwithstanding the shape of the monitor shown in the drawing, it may be a screen of a laptop, tablet or a mobile phone of a video conference participant) may display a significantly magnified (or otherwise highlighted) normalized view of a current speaker 410 occupying a central part of a grid 420 (the grid may be visible or invisible). Regular participants 430 may occupy other cells of the grid and normalized participant views may be much smaller. Participants or organizers of a video conference may have filtering tools to display a subset of participants, which may be different for different monitors.

FIG. 4B shows a discussion centric arrangement and display of normalized participant views. In FIG. 4B, a display grid 440 may be split into an enlarged upper portion, which displays enlarged or otherwise highlighted normalized views of the current speaker 410 and commenter(s) 450 or other contributors to a discussion. The regular participants 430 may be displayed in smaller cells in a bottom portion of the display grid.

FIG. 4C shows an example of attitude, voting or otherwise categorized arrangement and display of normalized participant views. In this illustration, a display grid 460 may have a column for the current speaker 410 (shown on the left), while the rest of the grid may be split into columns (exemplified by two columns 470, 480; splitting into rows or other blocks may also be an option) representing certain categories of participants, such as participants with positive and negative attitudes toward the video conference (as explained elsewhere herein), participants by outcomes of a vote taken at a meeting, etc. The normalized participant views 430 of regular participants may be displayed in appropriate ones of the columns 470, 480 depending on a category to which a particular participant has been assigned by an identification module.

Figure 5:
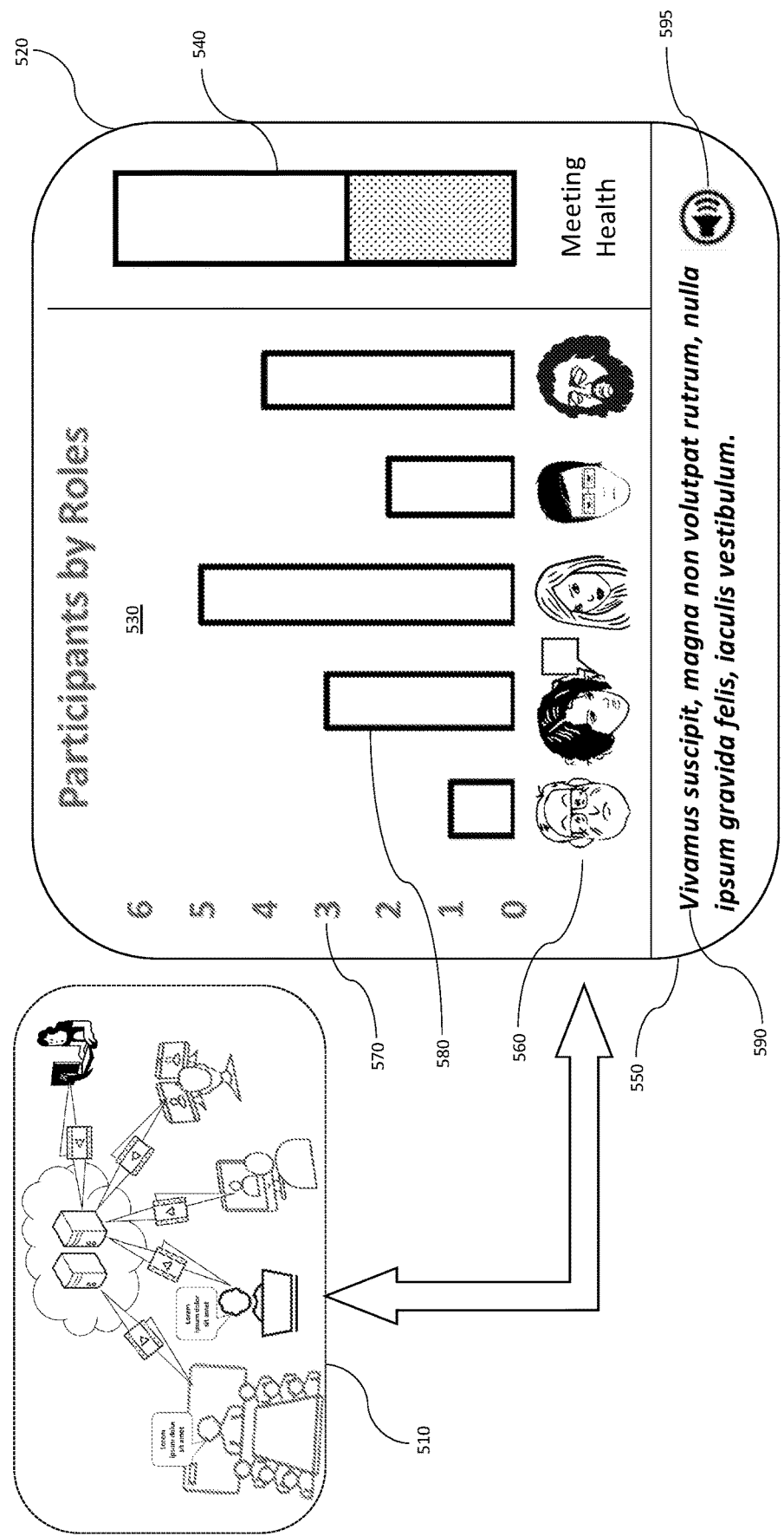
FIG. 5 is a schematic illustration of a video conference health panel, according to an embodiment of the system described herein.

FIG. 5 is a schematic illustration 500 of a video conference health panel 520. Based on capturing, integrating, distributing and processing video streams and other data related to a video conference 510, the system may build the video conference health panel (dashboard) 520. The conference health panel 520 illustrated in FIG. 5 includes three sections: a conference status graph 530, a conference health indicator 540, and an automatic moderation section 550. The conference status graph 530 may be presented as a column chart with a set of currently identified participant roles 560, as explained elsewhere herein (for example, speaker, opponent, active listener, supporter, bored participant, inactive participant, etc.). The conference status graph 530 may also include a numeric scale 570 and columns 580 dynamically showing the number of participants in each state based on assessment by the system of the conference as a whole and of verbal expressions/non-verbal cues of the participants. The conference health indicator 540 may be presented as a single column showing a snapshot of a numeric value of the conference health, calculated, for example, as a weighted sum of column values on the conference status graph 530, as explained elsewhere herein. The system may automatically generate recommendations 590 to various meeting participants, which may be displayed in the moderation section 550 or broadcasted (for example, as audio messages 595). There may be multiple options of automatic moderation of a conference by the proposed system, as explained elsewhere herein. In addition to delivery of automatic recommendations to different groups of participants, the system may sound or display an alarm when the conference health index falls below a predefined threshold (for example, 50%). Developing recommendations and other moderation step may include analyzing participant profiles, as explained elsewhere herein.

Figure 6:
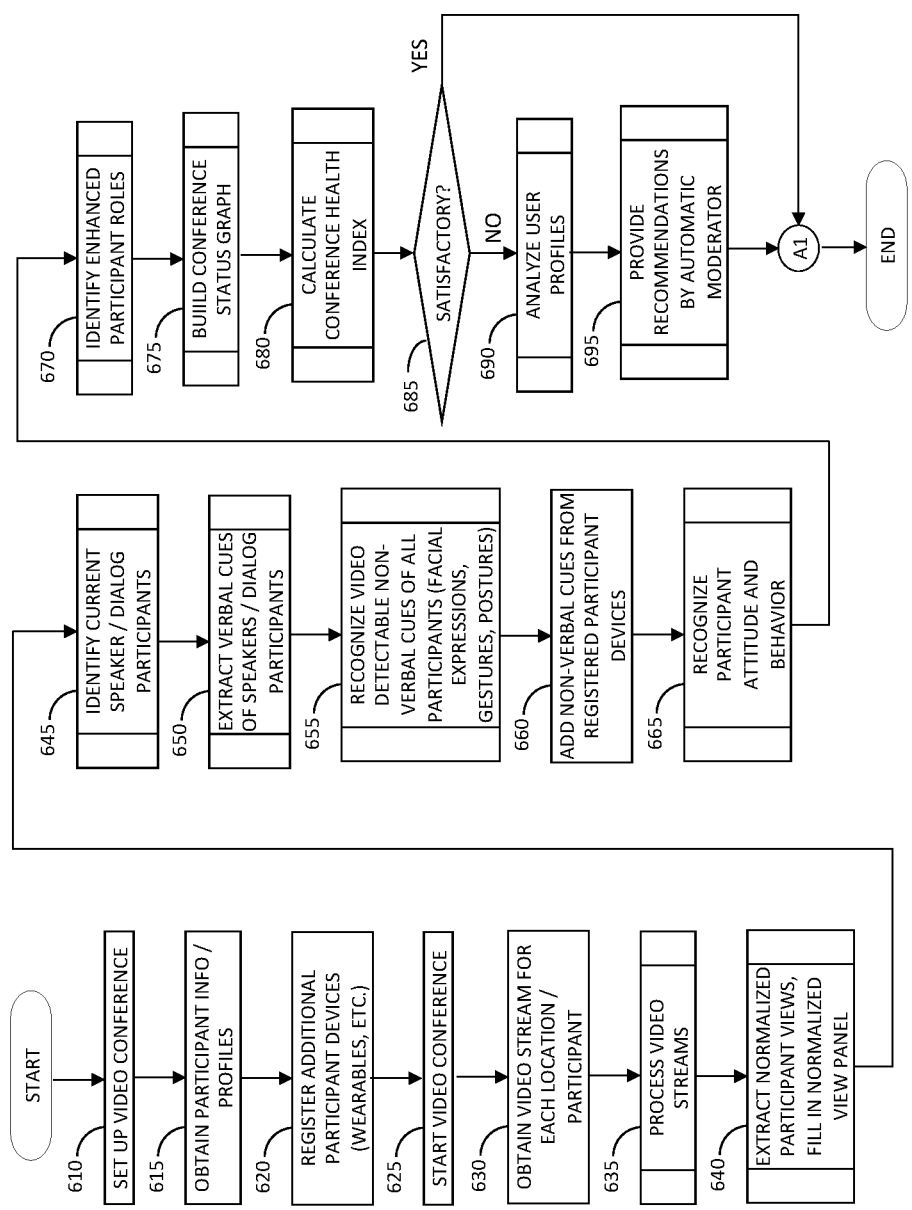
FIG. 6 is a system flow diagram illustrating system functioning in connection with capturing, streaming, processing and moderating a video conference, according to an embodiment of the system described herein.

Referring to FIG. 6, a system flow diagram 600 illustrates system functioning in connection with capturing, streaming, processing and moderating a video conference. Processing begins at a step 610, where a video conference is set up using a video conferencing service (see, for example, FIG. 1 and the corresponding text). After the step 610, processing proceeds to a step 615 where the system obtains participant information and profiles, as explained elsewhere herein. After the step 615, processing proceeds to a step 620, where the system registers additional participant devices, such as wearables. After the step 620, processing proceeds to a step 625, where a video conference is started and video streams between participants and a video conferencing service become available. After the step 625, processing proceeds to a step 630, where the system obtains video streams for each location of a video conference (such as a conference room or an open conferencing friendly area in an office) and of each individual participant who may be connecting to the conference from a personal or other device. After the step 630, processing proceeds to a step 635, where the system processes captured video streams, as explained elsewhere herein (see, for example, FIG. 1 and the accompanying text). After the step 635, processing proceeds to a step 640, where the system extracts normalized participant views and (optionally) fills in the normalized view panel, as explained elsewhere herein, in particular, in FIG. 2 and the accompanying text.

After the step 640, processing proceeds to a step 645, where the system identifies a current speaker and participants of a dialogue with the current speaker (if any). After the step 645, processing proceeds to a step 650, where the system extracts verbal cues attributed to speakers and dialog participants. After the step 650, processing proceeds to a step 655, where the system recognizes video detectable non-verbal cues of all participants, such as facial expressions, gestures and postures, as explained elsewhere herein (see, for example, FIG. 3 and the accompanying text). After the step 655, processing proceeds to a step 660 where the system adds recognizable non-verbal cues from other registered participant devices, such as wearables with various types of sensors. After the step 660, processing proceeds to a step 665, where the system recognized participant attitude and behavior, as explained elsewhere herein, see, for example, FIG. 3 and the corresponding text. After the step 665, processing proceeds to a step 670 where enhanced participant roles are identified. After the step 670, processing proceeds to a step 675 where the system builds an instance of the conference status graph, as explained, in particular, in connection with FIG. 4. After the step 675, processing proceeds to a step 680, where the system calculates a current value of a conference health index (see a sample formula elsewhere herein). After the step 680, processing proceeds to a test step 685 where it is determined whether the current conference health value is satisfactory. If so, processing is complete; otherwise, processing proceeds to a step 690, where the system analyzes user profiles. After the step 690, processing proceeds to a step 695, where the system provides recommendations by its automatic moderator subsystem. After the step 695, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations may vary from the illustrations presented herein. Further, various aspects of the system described herein may be deployed on various devices, including, but not limited to smartphones, tablets and other mobile computers. Smartphones may use operating system(s) selected from the group consisting of: iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing a video conference, comprising:
connecting a current active speaker and non-speaking participants of the video conference to at least one video conferencing server that sends and receives video streams between the non-speaking participants and the current active speaker;
identifying the current active speaker from among all of the participants of the video conference based on at least one of: detecting continuous audio streams, audio diarization based on voice profiles and disposition, or identification of lip movements;
detecting verbal and non-verbal cues of the non-speaking participants;
using verbal cues to detect active participants;
using the non-verbal cues to track reactions of the non-speaking participants to segments of a presentation provided by the current speaker and to interactions among the current speaker and the active participants;
determining a health index of the video conference based on the reactions of the non-speaking participants, interactions among the current speaker and the active participants, and on non-conventional roles assigned to the non-speaking participants based on detected emotional states of the non-speaking participants; and
providing to at least a subset of the participants recommendations based on the health index for modifying the video conference.

2. A method, according to claim 1, wherein the non-verbal cues include at least one of: facial expressions, body language, gestures, postures, and eye contact.

3. A method, according to claim 1, wherein the interactions among participants include at least one of: discussions, agreement, disagreement, interruption, and eye-rolling.

4. A method, according to claim 1, wherein the recommendations include asking a participant to provide an opinion on a subject matter being discussed in the video conference.

5. A method, according to claim 4, wherein the participant is an expert in the subject matter being discussed.

6. A method, according to claim 5, wherein the participant is asked to provide an opinion in response to at least one of: the participant not participating in the discussion and the participant looking bored or indifferent.

7. A method, according to claim 6, wherein the participant is asked to provide an opinion in response to the health index being below a pre-determined value.

8. A method, according to claim 1, wherein the health index is a weighted sum of participant numbers for each of the non-conventional roles of each of the participants.

9. A method, according to claim 8, wherein positive weights are assigned to active and productive ones of the non-conventional roles and negative weights are assigned to passive, indifferent and unproductive ones of the non-conventional roles and wherein the non-conventional roles are based, at least in part, on the reactions of the participants.

10. A method, according to claim 9, wherein the health index is provided by:

$$h = \left( \sum_{i \in P^+} w_i^+ \cdot n_i + \sum_{i \in P^-} w_i^- \cdot n_i \right) / (W \cdot N)$$

where h is video conference health index;
$P^+$, $P^-$ are sets of positive (active, productive) and negative (passive, non-productive) non-conventional roles currently identified by the system among conference participants;
$w_i^+, w_i^-$ are positive and negative numeric values of weights assigned to each of the non-conventional roles;
$n_i$ is a number of conference participants identified by the system in each of the non-conventional roles;

$W = \Sigma_{i \in P^+} |w_i^+| + \Sigma_{i \in P^-} |w_i^-|$; and
$N = |P^+| + |P^-|$.

11. A method, according to claim 1, further comprising:
providing a visual health board that includes a graphical representation of the health index.

12. A method, according to claim 11, wherein the visual heath board includes a conference status graph that dynamically shows a count of participants in each of a plurality of possible ones of the non-conventional roles that are determined based, at least in part, on the reactions of the participants.

13. A method, according to claim 12, wherein at least some of the recommendations are placed on the visual health board.

14. A method, according to claim 1, wherein the video streams are pre-processed to create normalized frontal views of the participants.

15. A method, according to claim 14, wherein, for a group of participants that share one or more video cameras, individual participants are identified and tracked within a sequence of scenes captured by the one or more video cameras to create the normalized frontal views.

16. A method, according to claim 14, wherein a plurality of the normalized frontal views of participants are arranged together on a single display.

17. A method, according to claim 16, wherein the normalized frontal views are speaker centric with a magnified view of the speaker.

18. A method, according to claim 16, wherein the normalized frontal views are placed in columns according to categories that correspond to a feature related to the video conference.

19. A method, according to claim 1, further comprising:
using data from embedded sensors of wearable devices owned by meeting participants along with the non-verbal cues to track reactions of the participants to segments of a presentation provided by the speaker.

20. A method, according to claim 19, wherein the data from embedded sensors includes data for at least one of: heart rate, sweating, and blood pressure.

21. A method, according to claim 1, wherein at least some of the recommendations are broadcast to at least some of the participants.

22. A method, according to claim 1, wherein at least some of the recommendations are generated based on the health index falling below a pre-determined threshold.

23. A method, according to claim 1, wherein at least some of the recommendations are generated based on analyzing profiles of the participants.

24. A method, according to claim 1, wherein the non-conventional roles include at least one of: an opponent, an active listener, a supporter, a bored participant, and an inactive (sleeping) participant.

25. A method, according to claim 1, further comprising:
tracking changing reaction of various meeting participants to each speaking fragment or subsequent short speaking fragments and sequences belonging to other participants following identifying a current speaker.

26. A method, according to claim 1, wherein interactions among the current speaker and the active participants include one of the active participants interrupting the current speaker.

27. A non-transitory computer readable medium that contains software that manages a video conference, the software comprising:
executable code that connects a current active speaker and non-speaking participants of the video conference to at least one video conferencing server that sends and receives video streams between the non-speaking participants and the current active speaker;
executable code that identifies the current active speaker from among all of the participants of the video conference based on at least one of: detecting continuous audio streams, audio diarization based on voice profiles and disposition, or identification of lip movements;
executable code that detects verbal and non-verbal cues of the non-speaking participants;
executable code that uses the non-verbal cues to track reactions of the non-speaking participants to segments of a presentation provided by the current speaker and to interactions among the current speaker and the active participants;
executable code that determines a health index of the video conference based on the reactions of the non-speaking participants, interactions among the current speaker and the active participants, and on non-conventional roles assigned to the non-speaking participants based on detected emotional states of the non-speaking participants; and
executable code that provides to at least a subset of the participants recommendations based on the health index for modifying the video conference.

28. A non-transitory computer readable medium, according to claim 27, wherein the non-conventional roles include at least one of: an opponent, an active listener, a supporter, a bored participant, and an inactive (sleeping) participant.

29. A method, according to claim 25, wherein the speaking fragments include at least one of: questions and answers, dialogs or comments.

30. A non-transitory computer readable medium, according to claim 27, further comprising:
executable code that tracks changing reaction of various meeting participants to each speaking fragment or subsequent short speaking fragments and sequences belonging to other participants following identifying a current speaker.

31. A non-transitory computer readable medium, according to claim 30, wherein the speaking fragments include at least one of: questions and answers, dialogs or comments.

32. A non-transitory computer readable medium, according to claim 27, wherein interactions among the current speaker and the active participants include one of the active participants interrupting the current speaker.

* * * * *